United States Patent [19]

Kobashi et al.

[11] 3,804,422

[45] Apr. 16, 1974

[54] RECORD PLAYER

[75] Inventors: Rikiya Kobashi, Amagasaki; Tomohiko Nakamura, Osaka; Mikio Itoi, Nishinomiya, all of Japan

[73] Assignee: Onkyo Kabushiki Kaisha, Osaka-shi, Japan

[22] Filed: Apr. 10, 1972

[21] Appl. No.: 242,339

[52] U.S. Cl. .............................. 274/15 R, 274/39 R

[51] Int. Cl. .............................. G11b 3/60, G11b 3/08

[58] Field of Search .............................. 274/15 R, 39 R

[56] References Cited

UNITED STATES PATENTS

| | | | |
|---|---|---|---|
| 3,425,703 | 2/1969 | Nanz et al. | 274/15 R |
| 2,099,868 | 11/1937 | Sing et al. | 274/15 R |
| 2,896,953 | 7/1959 | Costa et al. | 274/15 R |

*Primary Examiner*—Louis R. Prince
*Assistant Examiner*—Charles E. Phillips
*Attorney, Agent, or Firm*—Edwin E. Greigg

[57] ABSTRACT

A record player with function of automatically setting the pickup to the proper starting place corresponding to the record size, so that the needle is put on the play-starting portion of the record groove as defined by the record size. A plurality of record size sensing rods are mounted on the turntable and, corresponding to the size of the record put on the turntable, different number of the sensing rods are depressed down. Logic circuit actuates the pickup to the proper starting position, corresponding to which sensing rods are depressed.

2 Claims, 4 Drawing Figures

RECORD PLAYER

BACKGROUND OF THE INVENTION

In an automatic record player, it is necessary to automatically determine the size of a record placed on the turntable and place the needle of the pickup of the play-starting portion of the recording groove of the record regardless of the size of such record.

Among the hitherto used mechanisms for determining the size of records are (*a*) a mechanism which casts light on a record on the turntable, senses the reflected or transmitted light from the record and detects the size of the record on the basis of the state of the sensed light, (*b*) a mechanism which detects the size of a record on the basis of a difference in the weight of records on the turntable, and (*c*) a mechanism which has a lever adapted to contact the outer edge of a record on the turntable and detects the size of the record on the basis of the displacement of the lever. These mechanisms, however, are complicated and expensive and liable to supper malfunction and breakdown, and hence there is a strong demand for an improved mechanism.

SUMMARY OF THE INVENTION

The present invention relates to a record player wherein the size of a record placed on the turntable is automatically determined and the pickup movement in accord with the size of the record is automatically effected, thereby ensuring that upon starting of record playing, the pickup needle is automatically placed on the play-starting portion of the recording groove of the record on the turntable.

A record player according to the present invention comprises a plurality of rods adapted to be displaced in connection with the placement of a record on the turntable, said rods being attached to the turntable at different distances from the rotary shaft of the turntable so that the number of rods displaced by the gravity of the record is changed according to the size of the record, detecting means provided for each rod having a path of light adapted to cross the path of movement of the associated rod only when such rod is displaced, said detecting means being adapted to optically detect the displaced state of the associated rod, an electronic logic circuit for determing the size of a record on the turntable on the basis of signals from said detecting means, and a pickup driving mechanism for placing the needle of the pickup on the play-starting portion of the record on the turntable on the basis of a commanding signal from said electronic logic circuit.

That is, since the size of a record is detected by utilizing the displacement of rods which can be constructed at extremely low costs, unlike the conventional mechanism which detects the size of a record by optical means such as reflected or transmitted light, there is no disturbance such as a change in the state of a record itself, so that accurate detection can be reliably attained. Further, since the number of rods being displaced is utilized for size detection, unlike the conventional mechanism which utilizes a difference in the weight of records, there is no need to provide a precision mechanism and unlike the conventional mechanism which has a lever adapted to contact the outer end edge of a record, there is no relative contact movement between the rods and the record, so that detection can be effected for a long time without any trouble.

Further, since detection of the number of rods displaced is effected by utilizing detecting means having a path of light adapted to cross the path of movement of the associated rod only when such rod is displaced, there is no mechanical contact between the rod and the detecting means, which also ensures that detection can be effected for a long time without any trouble.

An object of the invention is to provide a record player wherein the mechanism for automatically detecting the size of records is made simple and inexpensive.

Another object of the invention is to provide a record player capable of accurate detection of the size of records without malfunction.

A further object of the invention is to provide a record player capable of detecting the size of records with less trouble by decreasing the number of mechanical actions, liable to cause trouble, among the record size detecting actions.

Yet another object of the invention is to provide a record player useful to records which are now in general use, i.e. three kinds of records of 30 cm, 25 cm and 17 cm in diameter.

DESCRIPTION OF THE PREFERRED EMBODIMENT

A preferred embodiment of the present invention will now be described with reference to the drawings shown by way of example.

Figures 1, 2, 3:
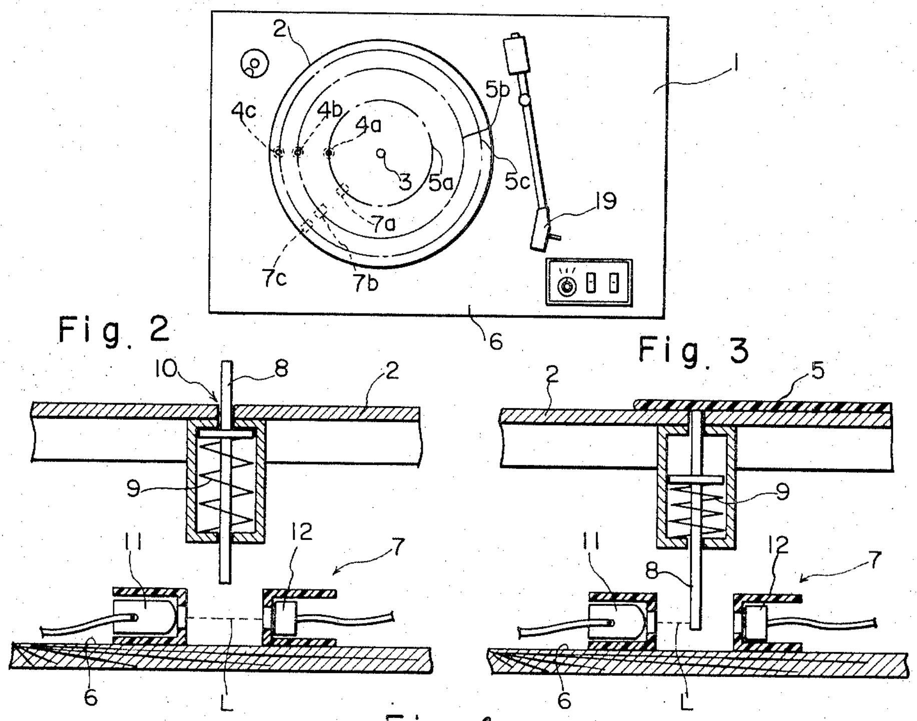
FIG. 1 is a top plan view showing a record player.
FIG. 2 is a vertical sectional view of the record player, with no record placed on the turntable.
FIG. 3 is a vertical sectional view of the record player, with a record placed on the turntable.

As shown in FIG. 1, three light-interrupting means 4*a*, 4*b* and 4*c* are radially and linearly arranged on the turntable 2 of a record player 1 at different distances from the rotary shaft 3 of the turntable 2. That is, the distance between the rod 8 of the innermost light-interrupting means 4*a* and the rotary shaft 3 is 8.5 cm or less, preferably about 8 cm, so that when a record 5*a* of 17 cm in diameter is placed on the turntable 2, as shown in FIG. 3, the rod 8 of the light-interrupting means 4*a* is located at a position below and close to the peripheral region of the record 5*a* and is depressed by the gravity of the record 5*a*. The distance between the rod 8 of the intermediate light-interrupting means 4*b* and the shaft 3 is 8.5 to 12.5 cm, preferably about 12 cm, so that when a record 5*b* of 25 cm in diameter is placed on the turntable, the rod 8 of the means 4*b* is depressed together with that of said light-interrupting means 4*a*. Finally, the distance between the rod 8 of the outermost light-interrupting means 4*c* and the rotary shaft 3 is 12.5 to 15 cm, preferably about 14.5 cm, so that when a record of 30 cm in diameter is placed on the turntable 2, the rod 8 of the means 4*c* is depressed together with those of said light-interrupting means 4*a* and 4*b*.

Three detecting means 7*a*, 7*b* and 7*c* are arranged on the motor board 6 of the record player 1 linearly and radially of the turntable 2 at different distances from the rotary shaft 3. That is, the innermost detecting means 7*a* is disposed in a position corresponding to the path of rotation of said innermost light-interrupting means 4*a*, the intermediate detecting means 7*b* is disposed in a position corresponding to the path of rotation of said intermediate light-interrupting means 4*b* and the outermost detecting means 7*c* is disposed in a position corresponding to the path of rotation of said outermost light-interrupting means 4*c*, so that the three light-interrupting means 4*a*, 4*b* and 4*c* simultaneously pass through the positions of the detecting means 7*a*, 7*b* and 7*c*, respectively.

Although radially linear arrangement of the light-interrupting member 4*a*, 4*b* and 4*c* and of the detecting members 7*a*, 7*b* and 7*c* is illustrated and described as above, this radially linear arrangement is of no imperative requirement. The essential point is to provide the light interrupting members and the detecting members in the same arrangement or configuration, so that all the pairs of the light-interrupting members and the associated detecting members are simultaneously brought to the vertical alignment or registering positions as the turntable rotates.

In each of said light-interrupting means 4*a*, 4*b* and 4*c*, the rod 8 inserted in an opening 10 is upwardly pushed by a spring 9 and, as shown in FIG. 2, when there is no record 5 placed on the turntable 2, the upper end of the rod 8 projects above the upper surface of the turntable 2. But when a record 5 is placed on the turntable 2 as shown in FIG. 3, the rod 8 is depressed with the lower end thereof projecting downwardly.

Each of said detecting means 7*a*, 7*b* and 7*c* comprises a lighting unit 11 and a light-receiver 12 suitably spaced therefrom and comprising a photoelectric element for producing a signal output to fluctuate in response to exposure to and screening out from the light, there being a path of light L extending from the lighting unit 11 to the light-receiver 12. The path of light L for each detecting means crosses the path of movement of the rod 8 only when the rod is displaced. Therefore, when the rod 8 depressed by the record 5 passes across the path of light L, signal output of the light-receiver 12 temporarily fluctuates, resulting in a pulse form signal.

Figure 4:
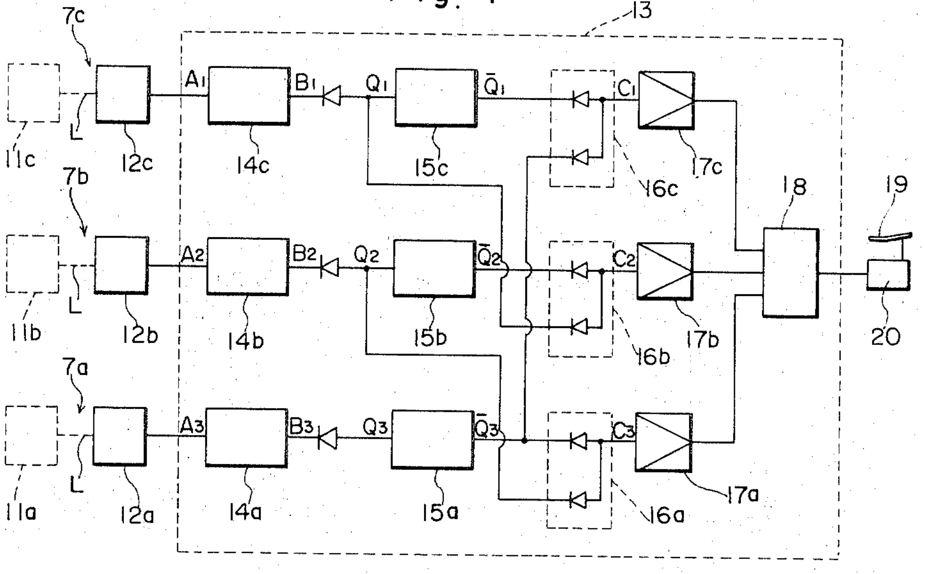
FIG. 4 is a block diagram showing a signal transmission and operation system.

As shown in FIG. 4, all of the light-receivers 12*a*, 12*b* and 12*c* are coupled to a logic circuitry 13 including electronic operation circuits. In this logic circuitry 13, the size of a record 5 placed on the turntable is judged on the basis of signals from the individual light-receivers 12*a*, 12*b* and 12*c* and a command output is given on the basis of such judgment for placing the needle of the pickup 19 on the play-starting portion of the recording groove of the record 5. On the basis of a signal output of the logic circuitry 13, a pickup driving mechanism 20 is actuated to lower the pickup 19 to the required position for starting the playing of the record.

The operation of the logic circuitry will now be described in more detail.

The light-receivers 12*a*, 12*b* and 12*c* are provided with Schmitt triggers 14*a*, 14*b* and 14*c*, respectively, whereby pulse signals A1, A2, A3 of rather dull shape from the light-receivers are reshaped into sharp pulse signals B1, B2 and B3. The Schmitt triggers 14*a*, 14*b* and 14*c* are provided with flip-flops 15*a*, 15*b* and 15*c*, respectively. The flip-flops 15*a*, 15*b* and 15*c* are so arranged that when pulse signals from the Schmitt triggers 14*a*, 14*b* and 14*c* are transmitted thereto, signals Q1, Q2 and Q3 on the input side are changed from high to low level while signals $\overline{Q}1$, $\overline{Q}2$ and $\overline{Q}3$ on the output side are changed from low to high level such changed state being maintained. In the embodiment as illustrated, there are provided an AND-gate 16*c* which receives the output signal $\overline{Q}1$ from the flip-flop 15*c* and the output signal $\overline{Q}3$ from the flip-flop 15*a*, an AND-gate 16*b* which receives the output signal $\overline{Q}2$ from the flip-flop 15*b* and the input signal Q1 to the flip-flop 15*c*; and an AND-gate 16*a* which receives the output signal $\overline{Q}3$ from the flip-flop 15*a* and the input signal Q2 to the flip-flop 15*b*. Signals C1, C2 and C3 from the respective flip-flops are transmitted to a control mechanism 18 through respective amplifiers 17*a*, 17*b* and 17*c* and on the basis of a signal from the control mechanism 18 the pickup 19 driving mechanism 20 is actuated.

That is, according to the presence or absence of a record 5 on the turntable 2 and also to the size of a record placed on the turntable, the input signals Q1, Q2 and Q3 to and output signals $\overline{Q}1$, $\overline{Q}2$ and $\overline{Q}3$ from the respective flip-flops 15*c*, 15*b* and 15*a* are changed to low and high levels, as shown in Table 1, and according to these changes the output signals C1, C2 and C3 from the respective AND-gates 16*c*, 16*b* and 16*a* are changed to low and high levels. In the control mechanism 18, it is judged whether or not there is high level among the output signals C1, C2 and C3 coming from the AND-gates 16*c*, 16*b* and 16*a* and which AND-gate the signal at high level comes from, and on the basis of such judgment the required command is given to the pickup driving mechanism 20, whereby the needle of the pickup 20 is reliably placed on the play-starting end of the recording groove regardless of the size of the record 5.

TABLE 1

A list of changes in the level in flip-flop and AND-gate.

| | Flip-flop | | | | | | AND-gate | | |
|---|---|---|---|---|---|---|---|---|---|
| | Q1 | $\overline{Q}1$ | Q2 | $\overline{Q}2$ | Q3 | $\overline{Q}3$ | C1 | C2 | C3 |
| With no record placed | H | L | H | L | H | L | L | L | L |
| With record placed: | | | | | | | | | |
| 30 cm | L | H | L | H | L | H | H | L | L |
| 25 cm | H | L | L | H | L | H | L | H | L |
| 17 cm | H | L | H | L | L | H | L | L | H |

It is not essential to provide the ANG-gate 16*c* to take as one of the input signals therefor the output signal $\overline{Q}3$ of the flip-flop 15*a*, as illustrated and as described above. The logic circuitry will normally operate without any trouble at all even if there be no such provision, thus abolishing the AND-gate 16*c* and connecting the output signal $\overline{Q}1$ of the flip-flop 15*c* directly to the amplifier 17*c* as input signal therefor. The merit of providing the said AND-gate 16*c* with signal $\overline{Q}3$ as one of the inputs therefor, is only to prevent to actuate the pickup 9 to play-starting position for the record 5 of 30 cm diameter when the rod 8 of the light-interrupting means 4*c* should accidentally be lowered without any such record of 30 cm diameter put on the turntable 2. With the circuitry as illustrated and described, such wrong actuation of the pickup 9 will not occur so long as the rod 8 of the light-interrupting means 4*a* is left unlowered.

The logic circuitry has heretofore been described as comprising the electronic component parts, as is evident from the illustration of the AND-gates 16*a*, 16*b* and 16*c* as double-diode type. However, the logic circuitry may as well be of electromagnetic relay type, if the component elements are properly modified accordingly, for instance to provide arcuate light-interrupting plate on each rod 8 in order to get sufficient actuating time as required for such relay units.

What we claim is:

1. A record player comprising, in combination:

a. a turntable having an upper surface for supporting records;

b. a plurality of downwardly displaceable members mounted on said turntable at respectively different distances from the axis of rotation of said turntable with a portion of each of said members extending above said upper surface, said members being displaceable downwardly by the weight of a record whenever a given record of respective diametral size is placed on said turntable;

c. a plurality of detecting means each including respective light source means and photoelectric means positioned beneath said turntable in proximity to respective ones of said displaceable members, each said light source means and each said photoelectric means being separated from one another by respective free space into which a portion of respective ones of said displaceable members may project upon downward displacement by a record on said upper surface and rotation of said turntable, said plurality of detecting means including:

1. a plurality of Schmitt trigger circuits, each Schmitt trigger circuit being coupled to a respective one of said photoelectric means for converting electrical signals received therefrom into regular pulse signals; and
2. a plurality of flip-flop circuits coupled respectively to respective ones of said Schmitt trigger circuits and responsive to regular pulse signals therefrom for establishing input signals of one level and output signals of second level, the first and second levels differing from one another;

d. logic circuit means coupled to said plurality of detecting means and responsive to outputs therefrom for producing a control signal indicative of diametral size of a record on said upper surface, said logic circuit means including:

3. a plurality of AND circuits corresponding in number to said displaceable members, each said AND circuit having one input coupled to a respective one of said flip-flop circuits for receiving output signals therefrom and a second input coupled to a respective different one of said flip-flop circuits for receiving input signals supplied thereto and each said AND circuit producing an output ONE upon receipt of signals at both its inputs of high level and an output ZERO upon receipt of a signal at either of its inputs of low level, only one of said AND circuits producing a ONE at any given time; and
4. a second plurality of flip-flop circuits, each of said second plurality of flip-flop circuits being coupled to a respective one of said AND circuits and responsive to its output for producing a respective control signal whenever a ONE signal is received therefrom;

e. a pickup having a stylus;

f. pickup driving means coupled between said pickup and said logic circuit means and responsive to the control signal from said logic circuit means for producing an actuating signal for setting said stylus in its starting position in the groove of a record on said turntable upon downward displacement of said member; and g. control means coupled to each flip-flop circuit of said second plurality of flip-flop circuits and responsive to signals therefrom, said pickup driving means being coupled to said control means and responsive to output signals therefrom.

2. A record player as set forth in claim 1, including a shaft for rotating said turntable and wherein said plurality of displaceable members comprises three rods, one of said rods is innermost, one of which is outermost and one of which is intermediate, the distance between said innermost rod and said rotary shaft is no more than about 8.5 cm, the distance between said intermediate rod and said rotary shaft is from about 8.5 to about 12.5 cm, and the distance between said outermost rod and said rotary shaft is from about 12.5 to about 15 cm.

* * * * *